(12) United States Patent
Burbridge et al.

(10) Patent No.: US 8,035,489 B2
(45) Date of Patent: Oct. 11, 2011

(54) RADIO FREQUENCY IDENTIFICATION TRANSPONDER SECURITY

(75) Inventors: Trevor Burbridge, Suffolk (GB); Andrea Soperra, Suffolk (GB)

(73) Assignee: British Telecommunications public limited company, London (GB)

(*) Notice: Subject to any disclaimer, the term of this patent is extended or adjusted under 35 U.S.C. 154(b) by 1102 days.

(21) Appl. No.: 11/794,709

(22) PCT Filed: Jan. 11, 2006

(86) PCT No.: PCT/GB2006/000085
§ 371 (c)(1),
(2), (4) Date: Jul. 5, 2007

(87) PCT Pub. No.: WO2006/075150
PCT Pub. Date: Jul. 20, 2006

(65) Prior Publication Data
US 2008/0042804 A1   Feb. 21, 2008

(30) Foreign Application Priority Data
Jan. 12, 2005   (GB) .................................. 0500597.0

(51) Int. Cl.
*H04Q 5/22* (2006.01)
*G05B 19/00* (2006.01)
*H04L 29/06* (2006.01)
(52) U.S. Cl. ...................... 340/10.42; 340/5.8; 713/180
(58) Field of Classification Search .................. None
See application file for complete search history.

(56) References Cited

U.S. PATENT DOCUMENTS

| 4,309,569 | A | * | 1/1982 | Merkle ...................... 713/177 |
| 4,728,938 | A | | 3/1988 | Kaltner |
| 4,742,341 | A | | 5/1988 | Hogen Esch |
| 4,882,474 | A | | 11/1989 | Anderi et al. |
| 5,235,326 | A | | 8/1993 | Beigel et al. |
| 5,629,981 | A | | 5/1997 | Nerlikar |
| 5,841,365 | A | | 11/1998 | Rimkus et al. |
| 6,078,888 | A | | 6/2000 | Johnson, Jr. |
| 6,292,795 | B1 | | 9/2001 | Peters et al. |
| 6,490,680 | B1 | | 12/2002 | Scheidt et al. |

(Continued)

FOREIGN PATENT DOCUMENTS

EP   0 848 123 A2   7/1998

(Continued)

OTHER PUBLICATIONS

Henrici, D. et al., "Hash-based enhancement of location privacy for radio-frequency identification devices using varying identifiers", Proceedings of the Second IEEE Annual Conference on Pervasive Computing and Communications, Mar. 14-17, 2004, pp. 149-153.*

(Continued)

*Primary Examiner* — George Bugg
*Assistant Examiner* — Renee Dorsey
(74) *Attorney, Agent, or Firm* — Nixon & Vanderhye P.C.

(57) ABSTRACT

Security and privacy of tag information in an RFID-based system can be achieved through the usage of pseudonyms generated based on one-way hash functions. A system based on binary one-way trees allows for the scalable generation and decoding of authentication keys to obtain access to tag identities. The apparatus and methods described can also be adapted to provide limited access for readers to tag information.

7 Claims, 10 Drawing Sheets

U.S. PATENT DOCUMENTS

| | | | |
|---|---|---|---|
| 7,187,267 | B2 | 3/2007 | Cole |
| 7,940,179 | B2 | 5/2011 | Burbridge et al. |
| 2003/0018688 | A1 | 1/2003 | Sternin |
| 2004/0054900 | A1 | 3/2004 | He |
| 2004/0222878 | A1 | 11/2004 | Juels |
| 2005/0038736 | A1 | 2/2005 | Saunders |
| 2006/0181397 | A1 | 8/2006 | Limbachiya |
| 2008/0109124 | A1 | 5/2008 | Daum et al. |

FOREIGN PATENT DOCUMENTS

| | | |
|---|---|---|
| EP | 0 932 109 | 7/1999 |
| WO | WO 02/056216 | 7/2002 |
| WO | WO 03/052673 | 6/2003 |
| WO | WO 2004/086290 A1 | 10/2004 |
| WO | WO 2004089017 A1 | 10/2004 |

OTHER PUBLICATIONS

Ohkubo, M. et al., "Cryptographic Approach to Privacy-friendly Tags," in RFID Privacy Workshop, MIT, 2003.*

Naor, M. et al., "Universal one-way hash functions and their cryptographic applications", In Proceedings of the Twenty-First Annual ACM symposium on Theory of Computing (STOC '89), New York, NY, USA, pp. 33-43, 1989.*

Weis, S., "Security and Privacy in Radio-Frequency Identification Devices", Masters Thesis, MIT, 2003.*

Molnar, D. et al., "Privacy and Security in Library RFID: Issues, Practices, and Architectures", Proceedings of ACM CCS, Oct. 25-29, 2004, pp. 210-219.*

Weis, S. et al., "Security and Privacy Aspects of Low-Cost Radio Frequency Identification System", First International Conference on Security in Pervasive Computing, Mar. 2003.*

Juels, A. et al., "The blocker tag: selective blocking of RFID tags for consumer privacy", Proceedings of the 10th ACM Conference on Computer and Communications Security (CCS '03), ACM, New York, NY, USA, pp. 103-111, 2003.*

Avoine, G. et al., "A scalable and provably secure hash-based RFID protocol," Third IEEE International Conference on Pervasive Computing and Communications, PerCom Workshops, pp. 110-114, Mar. 8-12, 2005.*

Office Action mailed May 6, 2010 issued in related U.S. Appl. No. 11/794,715.

International Search Report for PCT/GB2006/000085 mailed Apr. 4, 2006.

Henrici et al., "Hash-based enhancement of location privacy for radio-frequency identification devices using varying identifiers", Pervasive Computing and Communications Workshops, 2004, Proceedings of the Second IEEE Annual Conference, pp. 149-153 (2004).

UK Search Report for Appln. No. GB 0500597.0 (Jun. 7, 2005), 1 pg.

UK Search Report for Appln. No. GB 0500596.2 (May 25, 2005) 4 pgs.

* cited by examiner

RADIO FREQUENCY IDENTIFICATION TRANSPONDER SECURITY

This application is the US national phase of international application PCT/GB2006/000085 filed 11 Jan. 2006 which designated the U.S. and claims benefit of GB 0500597.0, dated 12 Jan. 2005, the entire content of which is hereby incorporated by reference.

This invention relates to RFID (radio-frequency identification) technology in general, and specifically describes apparatus and methods for operating secure and private systems in the use of such technology.

Radio frequency identification (RFID) is a high potential enabling technology that can radically change the way that information is gathered about the physical world. RFID tags are typically used to perform the identification of multiple objects without requiring line-of-sight or manual intervention. With RFID, a pallet of goods within the supply chain can be inventoried without unloading or unpacking the pallet. Embedded into consumer products, RFID can provide the customer with a new shopping experience by permitting queue-free checkout and suppressing counterfeiting. After the initial point of sale, the RFID tag may be used by the consumer to enable services within their home, or used for product returns, recycling and secondhand sales. Automated identification devices have already been successful in libraries and media rental companies to improve the efficiency of rotating inventory systems. In the future, we may see many more items being tagged, and many new applications being enabled. RFID deployment is likely to have an impact on consumer purchasing habits. Consumers can obtain better product information through referencing the tag ID on the Internet. RFID promises to allow receipt-free returns and to reduce postsale theft. However, with these expected advantages, RFID technology has raised concerns in term of privacy. For an introduction to RFID systems, their components and operations, the reader is referred to the paper by Sama, Weis and Engels whose publication is referenced below and which is incorporated by this reference.

The fact that RFID tags can be read without requiring line of sight, and can be invisibly embedded in consumer products, makes it hard to control the privacy of their information. For ubiquitous application, tags have to be cheap (compromising its ability for security) and read at high speeds simultaneously (making it difficult to mandate complex notifications and authorisations). Privacy risks lead to two fundamental requirements—preventing information leakage, and preventing tracking. Further, tags by their nature do not stay within a single ownership domain, so they have to be transferable, but need to preserve the privacy of each current (and past) owner whose hands they pass through. In RFID applications where multiple parties must read the same tag without the transfer of ownership, the RFID system should ideally include the ability to delegate access to the tag to secondary parties.

If the same RFID tag is used throughout the product lifetime, or if the ID is encrypted with a secret key that remains unchanged, then the product can be tracked along the supply chain. Any party who can access a tag, has the ability to do so for the lifetime of the tag, with no regard to the privacy of the current owner. Such tags are vulnerable to unauthorised access e.g. in the context of industrial espionage, or worse.

It is therefore desirable to increase levels of security in the use of RFID tags. In particular, tags should not compromise the privacy of the holder of the tagged item. This means that unauthorised parties should not be able to gain access to the tag information. One aspect of this is that there should not be long-term associations allowing tracking by previously-authorised (but now unauthorised) readers—especially relevant in the context of supply chains.

The present invention describes apparatus and methods to operate an RFID-based system with improved security and privacy. For illustrative purposes, the discussion below takes place in the context of the supply chain for consumer goods, but it will be understood that the invention can have a wide range of applications and is thus not restricted to any particular context.

The following are some known methods to address the issues of privacy and security described above.

One method is to minimise the amount of information written on the tag. Product information is encoded in a way that enables supply chain practices but limits the disclosure of information to unwanted parties. Tags according to the EPCglobal and ISO-18000 standards support privacy protection commands incorporating a password-protected 'kill' command and a 48-bit read password to provide access control capabilities. The idea here is that the tag can be detected and disabled so that the tag and the tagged item become anonymous thereafter. For example in the retail context, the tag can be "killed" at the point of sale. One problem with this solution is the lack of flexibility: prior to being "killed", everyone can indiscriminately access the tag; after, no-one can. This would be inconvenient when, for example, a consumer wants to return a defective item after sale. The kill command scheme assumes that the tag ID is openly accessible to any party within read range of the tag. There is no provision for privacy between entities in the supply chain, or from other parties, before the tag is issued a kill command.

Another known method is to recode the tag. Currently, when a tagged product is sold, the retailer can still track the tagged item even though control of the tagged item has passed away from him. Recoding the tag involves the use of writable tags, and to perform a recoding operation when the product changes hands. In this case a reader would rewrite the tag with a new set of information and hold the mapping between the original Electronic Product Code (EPC) and the new code. Previous or future owners of the product will not be able to access tag information without having the access to the mapping. Access to the mapping can be controlled by a privacy policy enforced by the database that holds the mapping—the task of enforcing security is shifted from the resource-limited tag to the database. The drawback of this approach is the cost and administration of using an infrastructure. Every time ownership or control of the tagged item changes hands, each party in the supply chain will have to have the necessary equipment to perform recoding operation—which represents additional cost. Moreover, re-coding is vulnerable to re-coding by malicious parties unless some form of access control is provided.

Yet another known approach is to modify the identifier of the tag each time the tag is queried by a reader. The association between the product identifier and the product information is maintained in a secure database. Thus, a tag does not respond predictably to a reader by refreshing its identifier through the use of hash functions. The secure database can map the tag output with the product information, because it has access to the secret value used to generate the sequence of tag outputs.

Various proposals to improve security have been made, including the following:

A Juels and R Pappu: "Squealing Euros: Privacy-Protection in RFID-Enabled Banknotes" (Financial Cryptography '03, pages 103-121, R Wright, ed. Springer-Verlag. 2003. LNCS no. 2742.)

Sanjay E Sarma, Stephen A Weis and Daniel W Engels: "RFID Systems and Security and Privacy Implications" (Workshop on Cryptographic Hardware and Embedded Systems, pages 454-470. Lecture Notes in Computer Science, 2002.)

A Juels: "Minimalist Cryptography for RFID Tags" (Security of Communication Networks (SCN), C. Blundo, ed., 2004.)

According to a first aspect of the invention, there is provided a radio frequency identification transponder configured to respond, on detecting an interrogation attempt, by providing an output which is an identifier, the identifier being, or being based upon, a leaf or a node of a hash tree of at least binary order, wherein the identifier which is provided is different for every detected interrogation attempt.

According to a second aspect of the invention, there is provided a radio frequency identification transponder configured to respond, on detecting an interrogation attempt, by providing an output which is an identifier, the identifier being, or being based upon, a leaf or a node of a hash tree of at least binary order, wherein the identifier which is provided is different for every detected interrogation attempt, and which provides, in response to each of a sequence of detected interrogation attempts, one identifier of a predetermined sequence of identifiers which sequence is or is based on a predetermined sequence of leaves of the hash tree.

According to a third aspect of the invention, there is provided a system for providing a reader of RFID transponders with the right to read a particular transponder for only a predetermined multiplicity of read attempts, the system comprising:
   the reader;
   an authorisation means; and
   a radio frequency identification transponder configured to respond, on detecting an interrogation attempt, by providing an output which is an identifier, the identifier being, or being based upon, a leaf or a node of a hash tree of at least binary order, wherein the identifier which is provided is different for every detected interrogation attempt;
   the authorisation means and the transponder sharing knowledge of the hash tree of the tag which knowledge is not known to the reader;
   wherein the reader is
   (i) configured to interrogate the transponder, to obtain an identifier output by the transponder;
   (ii) arranged to contact the authorisation means and to reveal its own identity and the obtained identifier;
   the authorisation means being arranged to check the entitlement of the reader to read the transponder and, if the reader is entitled to read the transponder, to provide to the reader information about the hash tree to permit the reader to read the transponder over/for the predetermined multiplicity of a interrogation attempts.

According to a further aspect of the invention, there is provided a method for providing a reader of radio frequency identification transponders with the right to read a particular transponder for only a predetermined multiplicity of read attempts, the transponder being configured to respond, on detecting an interrogation attempt, by providing an output which is an identifier, the identifier being, or being based upon, a leaf or a node of a hash tree of at least binary order, wherein the identifier which is provided is different for every detected interrogation attempt, the method comprising:
(i) interrogating the transponder with the reader to obtain an identifier output by the transponder;
(ii) providing, from the reader, an authorisation authority with the identity of the reader and the obtained transponder identifier;
the authorisation authority checking the entitlement of the reader to read the transponder and, if the reader is entitled to read the transponder, providing to the reader information about the hash tree to permit the reader to read the transponder over/for the predetermined multiplicity of a interrogation attempts.

The present invention addresses the privacy and security issues raised by the use of RFID tags on items travelling on a supply chain or among multiple owners to be identified only by authorised parties, and only for a limited number of reading operations. This is achieved though the use of a pseudonym scheme by providing a more transient coupling between tag and reader, and arranging for the keys to be provided to the readers by a trusted third party.

Instead of requiring that the reader refer to the third party for each and every reading however, which is the approach taught by the prior art, the reader is given a temporary key, which expires after a designated number of read operations. This allows for a flexible system where authorised readers can be added or removed as desired, as the good moves along the supply chain.

The present invention also takes into account the very limited resources available in such RFID systems. Owing to cost considerations, only the most basic tags are likely to be considered for ubiquitous deployment in, for example, consumer good supply chains. Accordingly, only simple functions should be implemented in the tag. The present invention would require the use of one-way hash function in the tag device or pseudo random function or a combination of those.

Embodiments of the invention will now be described, by way of example only, with reference to the accompanying drawings, in which.

Figure 6:
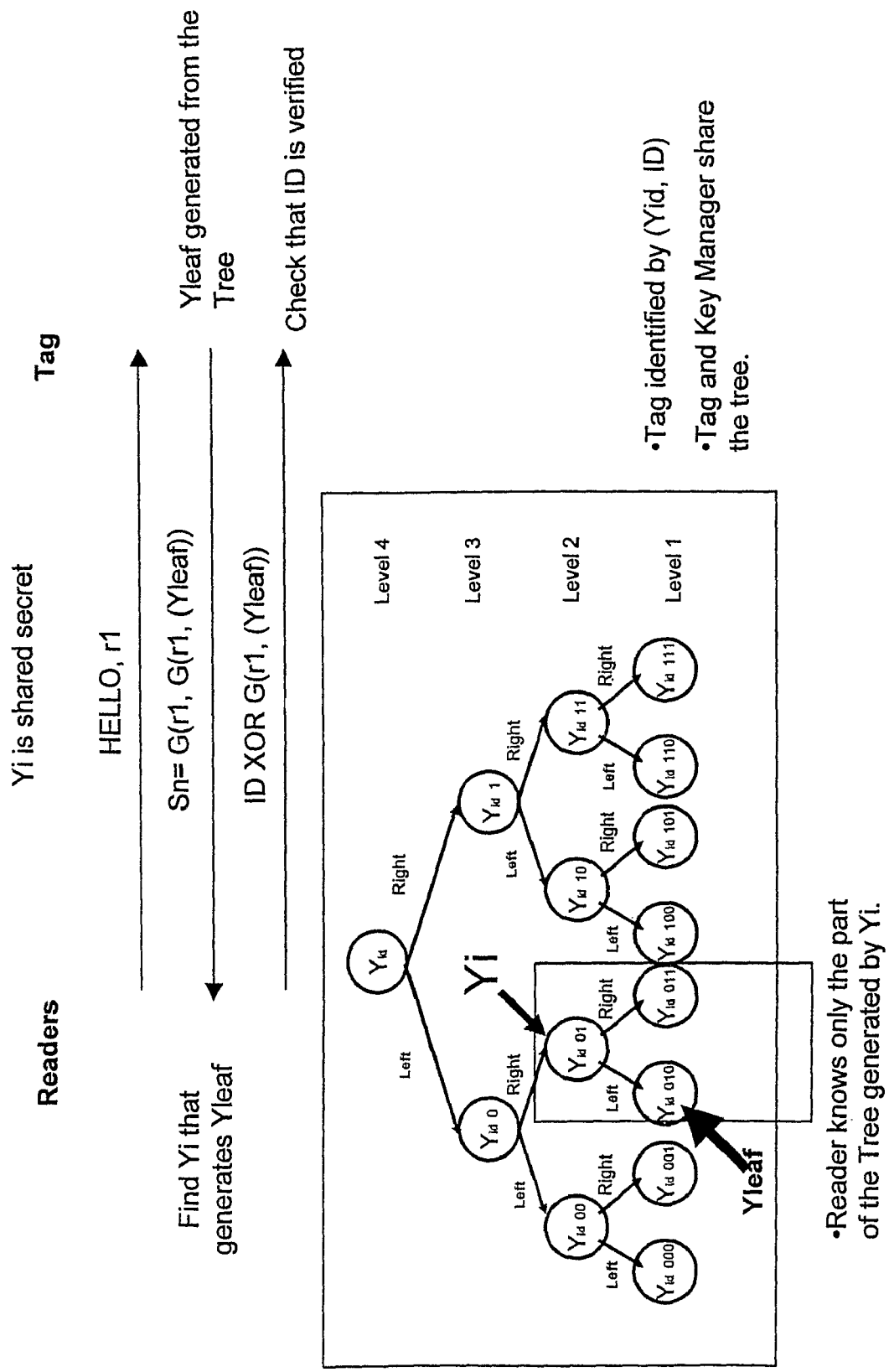
Figure 7:
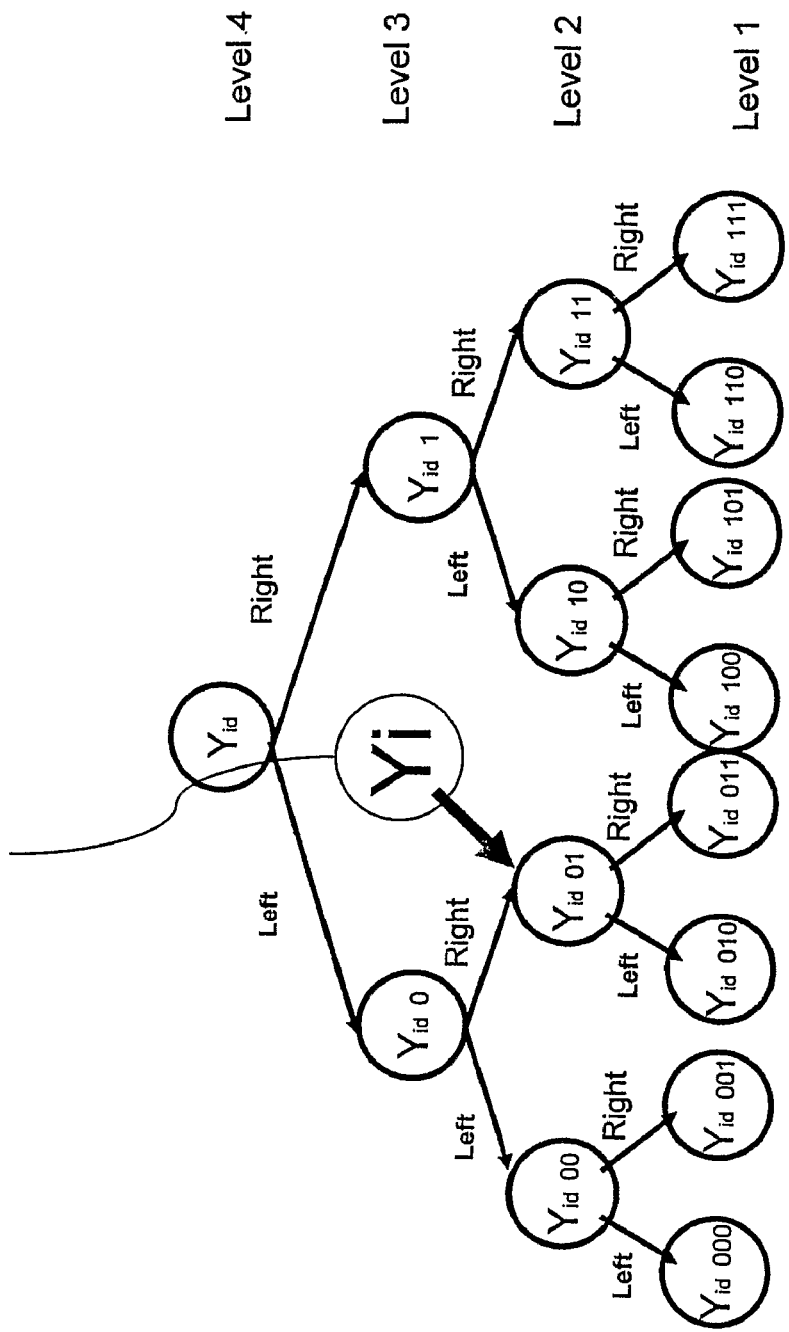
Figure 8:
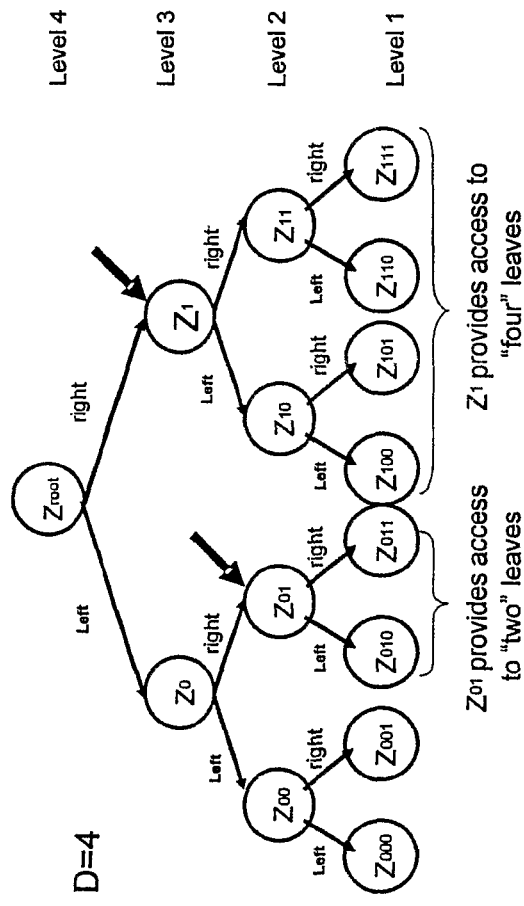
Figure 9:
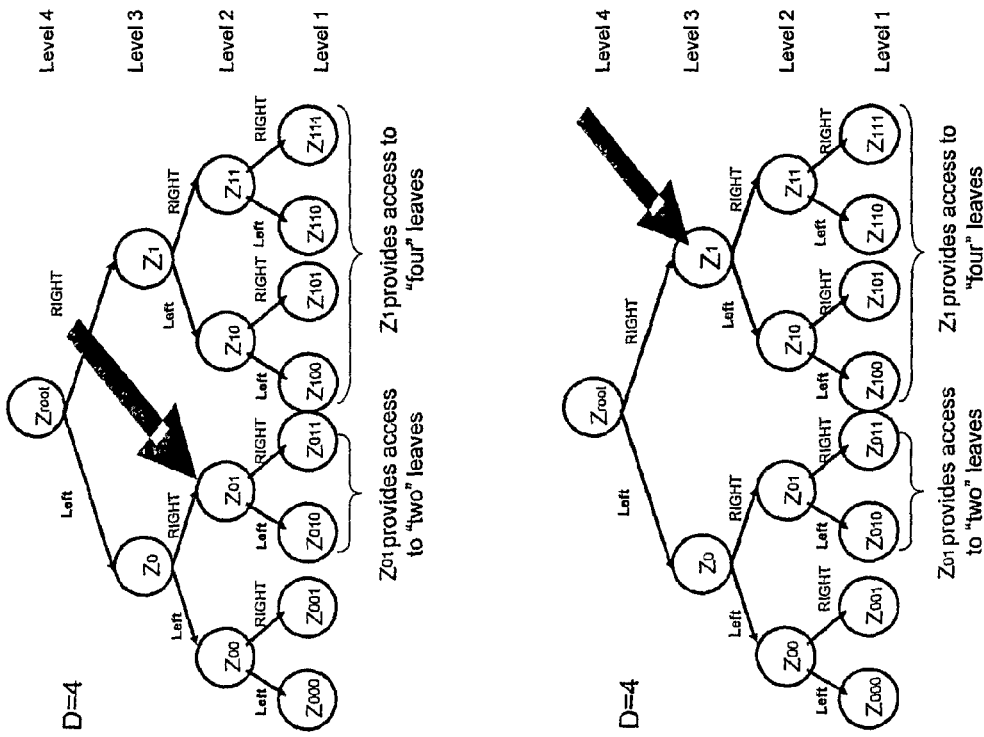
Figure 10:
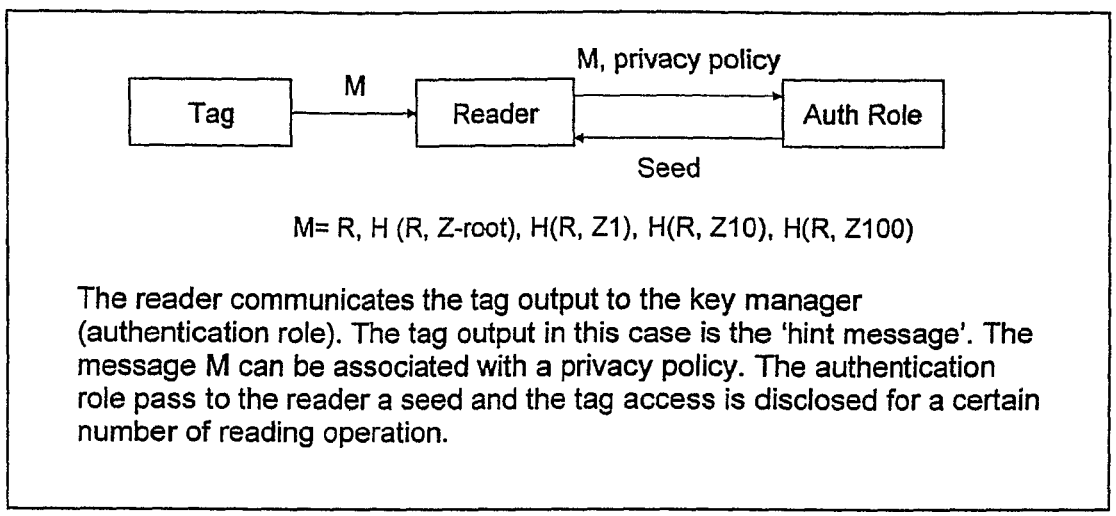

FIG. 6 depicts a private authentication scheme based on a hash scheme with a one-way binary tree FIG. 7 depicts how a hint message is used in to access a tag in connection with a one-way binary tree FIG. 8 depicts the use of a one-way binary tree in an alternative embodiment of the invention FIG. 9 depicts the reading operations in an alternative embodiment of the invention FIG. 10 depicts the operation of a hint message in an alternative embodiment of the invention.

Figure 1:
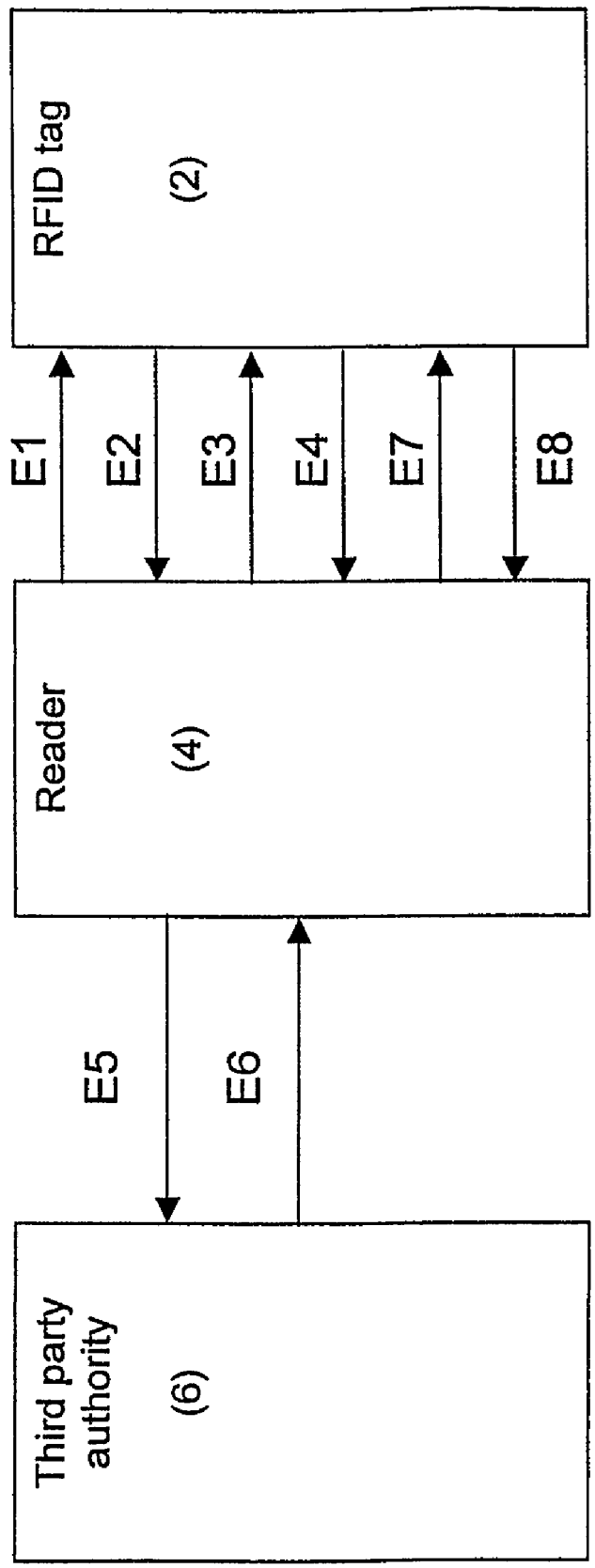
FIG. 1 depicts an embodiment of the invention for providing a reader temporary access to a tag in an RFID system

FIG. 1 is a schematic overview of an embodiment of the invention, showing the relationship and communications between the three main components of an RFID system according to the invention. A number of exchanges E1 to E5 take place in the course of events between the tag, reader and third party authority.

Figure 2:
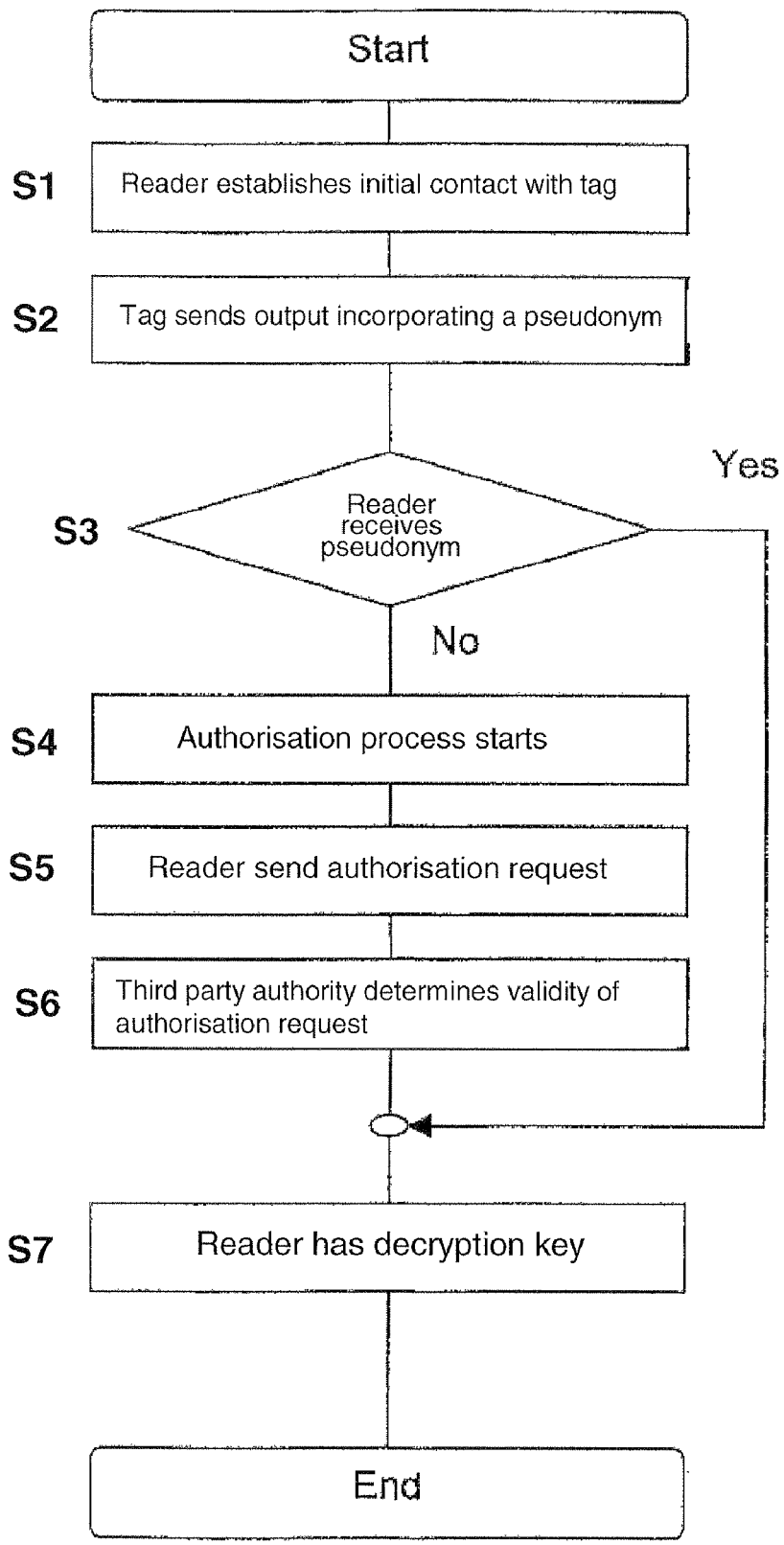
FIG. 2 is a flowchart describing the steps of the method depicted in FIG. 1

FIG. 2 is a flow chart describing the steps of a typical read and access session.

An embodiment of the invention will now be discussed in connection with FIGS. 1 and 2.

In step S1 of FIG. 2, the reader (4) establishes initial contact with the tag (2) by scanning it with the appropriate radio frequency radiation. This is depicted by the arrow labeled E1 in FIG. 1.

In step S2, the tag responds by sending output E2, incorporating a "pseudonym", to the reader.

In step S3, the reader receives the pseudonym (output E2). If the reader has within itself information which will allow it to "decode" the pseudonym ("YES"), it will not need to seek a decrypting key (sometimes referred to as "seed" within this description) from a third party authority. If the reader does not have this information ("NO"), the process moves into the authorisation phase.

Step S4 represents the start of the authorisation process. This is an optional step and it could be generated in response to a different command from the reader. The reader in this phase may obtain more information from the tag (see output E4 from the tag 2 in FIG. 1) to allow the decryption operation. This information could be under the form of a "Hint messages" or on the form of a longer pseudonym.

In step S5, the reader sends an authorisation request (E5) to a third party authority that has the information required by the reader (6). The authorisation request can comprise a combination of the pseudonym, the reader's credentials and optionally the hint message. The reader's credentials can be any pre-agreed matter which the third party authority would accept for purposes of determining if the particular reader should be granted authority and access to the tag's real ID. For example, they could include or be the reader's own ID. They could additionally or alternatively be information passed to the reader by the previous party in the supply chain by means of an electronic bill or the like. The third party authority checks the credentials, such as a certificate, in order to authenticate the reader before releasing information. Once the reader is authenticated, the access rights allowed to the reader can be retrieved and information released in accordance with these rights.

In step S6, the third party authority determines the validity of the authorisation request (E5). If it is satisfied that the reader should be authorised, it may release to the reader the decryption key(s) and the tag ID (E6). It may be the case that the authority contacted by the reader does not have sufficient keys to understand the information passed by the reader or generate the access key(s) for the reader. In this case the authority may pass the request onto another authority that has greater access rights.

In step S7, the reader now has the decryption key. This allows it to decode the pseudonym and obtain the true tag ID, by a method which is discussed below. As noted above in connection with step S3, if the reader already has the key at that stage, it can bypass the authorisation process (steps S1 to S6) and move directly to the decryption process in S7.

Exchanges E7 and E8 of FIG. 1 will be discussed below in connection with FIG. 4. These exchanges concern the optional steps of mutual authentication of tag and reader, which provide even greater security in use.

In this embodiment of the invention, the reader will have only temporary access to the tag. This is achieved by granting the reader only a limited number of reads. When this limit is reached, and the reader requires further access, a new authorisation phase must be applied for.

The role of the third party authority can be implemented by the tag manufacturer, or issuer, or the first user of the tag, as described above. It could also be performed by the device described in the applicants' co-pending patent application GB 0428543.3. Although at least one authority must have knowledge of the entire set of pseudonyms that may be generated by a tag, additional authorities may be delegated subsets of this knowledge, allowing them to grant access for only periods of the tag's life. Cascading the authorities in a hierarchy can reduce the load placed on the primary authority.

The third party authority can compute a time-limited secret that provides the reader the ability to decode pseudonyms for a particular tag for a limited number of times. In particular a third party authority can be allowed to compute a secret that allows recognition of the next n number of pseudonyms, where n is specified by application policy. The secret is communicated to the reader through a secure channel.

A problem is how to make the pseudonym system scale to a large number of tags without excessive complexity. In a database of n tags, one way decoding a pseudonym is to conduct a linear scan through all n tags. In the scheme of the present invention, the additional features of passage of ownership and time-limited secret do not increase the decoding complexity; this remains comparable with that in current RFID pseudonyms solutions.

Figure 3:
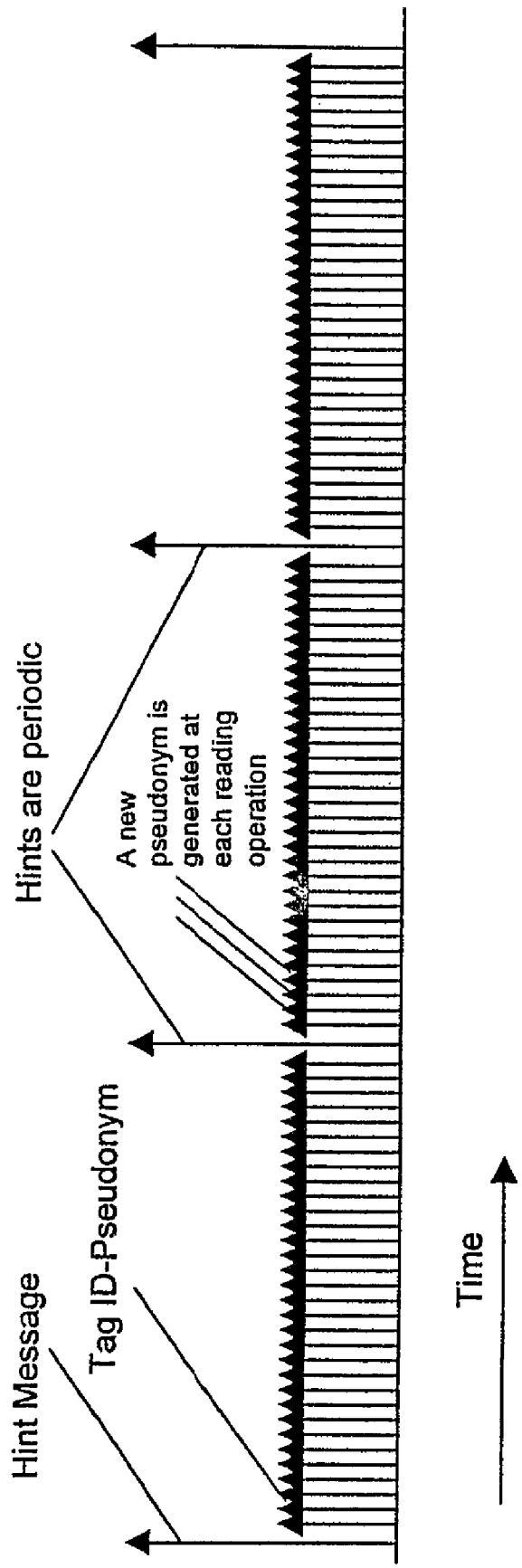
FIG. 3 depicts a first embodiment of how a tag can generate tag pseudonyms and hint messages.

FIG. 3 is a representation of a method to generate hint messages from the tag, briefly discussed in connection with step S4 above. When the reader requests a hint message from the tag (E3), a different command from the request for the next pseudonym (E1) may be used. Alternatively, a single reader command may be used, and the tag can release hint messages periodically—for example, one hint message for every n pseudonyms generated.

The tag's output (exchange E2 in FIG. 1) changes for each reading operation. In particular, each output of the tag cannot be correlated with any other previous or future tag output by an unauthorised reader. This is an important property to prevent tracking, and hint messages similarly must not be repeated. This means that a reader specifically requiring a hint message (through command E3), will have to advance the tag pseudonym (by making multiple read operations, for example) up to n steps before the hint is released. If other readers desire simultaneous access rights to the tag, this manner of outputting hints may not be the most efficient. The discussion below in connection with FIG. 10 also provides another solution concerning hint messages.

The following is an illustration of how the method described in FIGS. 1 and 2 can be applied in the context of a supply chain in the pharmaceutical industry:

Pharmaceutical items (such as drugs) are, at their point of manufacture, fixed with a tag. The tag implements a secure scheme according to the invention. Several such pharmaceutical items are typically packed together and sent to the next party in the supply chain—for example, distributors. The tag(s) on each item will be read several times by different parties before they leave the supply chain and enter the consumer domain.

When the pharmaceutical items transit between the manufacturing and wholesale domains, a bill will typically be sent to the destination (say, a wholesaler). The bill can contain a description of the products (e.g. their EPCs) and the location (e.g. the uniform resource locator) of a third party authority. This alone, or coupled with other information, could serve as all or part of the reader's credentials referred to in step S5 above. When the items reach the wholesaler, a reader will read the output of the tag(s) and request access from the third party authority. After being granted access, the wholesaler will have access to the tag ID(s). With such access, the wholesaler can then verify that all the products listed on the bill have arrived. Further, the wholesaler could also look up information associated with the tags in a database that might give information about matters such as the manufacturing dates of the items, etc. Such a database could be local to the wholesaler, or this could be a centralised database maintained by the manufacturer, for instance, that could provide e.g. up to date product information.

When a pharmacy puts in an order for the pharmaceutical items, the wholesaler arranges shipment and billing. The wholesaler passes on to the pharmacy the EPCs of the products and the contact details (such as the URL) of the third party authority. This information may again be contained in an electronic bill. While these details could accompany the goods as they are shipped from the wholesaler to the pharmacy, security is enhanced id they were sent separately, preferably in a secure manner. The pharmaceutical items would have a package or shipment ID which would also appear on the bill or other message from the wholesaler to the pharmacy, so that the EPCs of the items and the relevant URL can be clearly associated with a shipment received by the pharmacy.

When the items reach the pharmacy, the tags will again be read, and authorisation is again requested from the third party authority.

Of course, the shippers during any stage of the process above might require access to the tags and this could be obtained in the same way, by sending a request to the third party authority.

After reaching the retail pharmacy, the items will then be put on the shelves of the pharmacy for sale. When an item is sold, ownership is passed to the end user. The security solution according to the invention includes a method to revoke the pharmacy's access to the tag and to pass control to the user. This is an important feature of the system. For example, a person prescribed with 3TC is likely to have the human immunodeficiency virus, and might desire for such information to be kept confidential.

Now the tag is in the consumer domain. The consumer will have two options. The first option is that the user has no need to exploit the tag for any further service. In this case the solution according to the invention ensures the privacy of the user—no tracking or reading of medical information will be possible. Any attempt to read the tags without the decryption key will fail. It is, however, possible that the consumer needs to access the tag's ID. For example, the consumer could put the item on an "intelligent shelf", which would notify the consumer when a specific drug should be taken. In this case the consumer's reader would need to request tag ID access from the third party authority.

When the user disposes of the drug container with any unused drugs, the disposal company could use the tag for the recycling purposes. In this case, the scheme would protect the privacy of the consumer but would maintain the functionality of the tag for purposes of tracking and for linking to information on the disposal company's own database.

Figure 4:
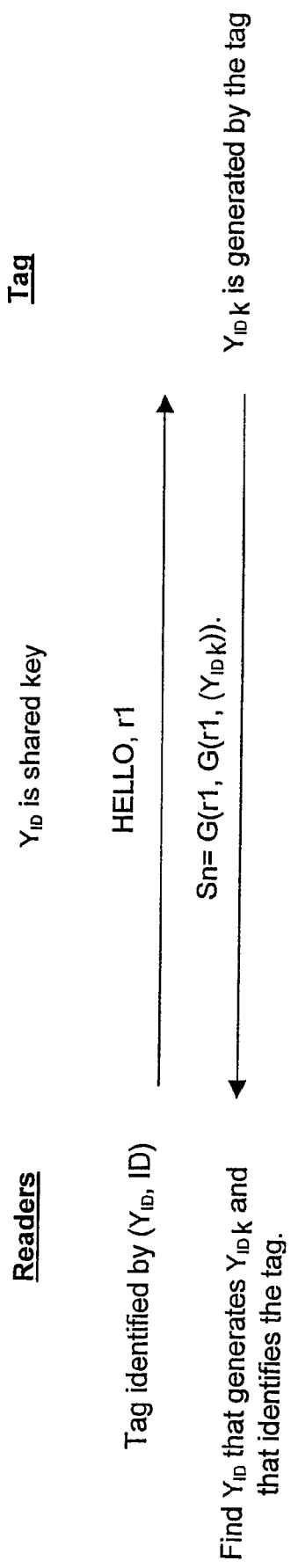
FIG. 4 depicts a private authentication scheme based on a hash scheme

FIG. 4 depicts the exchanges between the tag and a reader that take place in a hash-based pseudonym scheme. It is possible to prevent unauthorised tracking and identification of tags based on use of key hashed messages, described for example by Krawczyk, H, Bellare, M and R Canetti in "HMAC: Keyed-Hashing for Message Authentication" (RFC 2104, September, 1997).

At set-up time, the tag is provided with a unique pair of identifiers (YID, ID). YID is the secret (comprising a sequence of bits) which will be shared between the tag and an authorised reader. G is a one-way function (for example SHA1 or a Pseudo Random Function), whose operation is such that its output does not reveal any information about the input. When queried, the tag generates a new element produced from the application of one-way functions to the secret 'YID' and obtains, over multiple reads, a series of elements: YID 1, YID 2 . . . YID n−1, YID n. For each transaction a pseudonym Sk=r1, G (r1, G(r1,YID k)) will be generated and sent by the tag to the reader.

The reader will identify the pair (YID, ID) that verifies the tag message may optionally reply to the tag with ID XOR G (r1,YID k). This information authenticates the identity of the reader to the tag allowing for mutual authentication, as G (r1, YID k) can only be generated by a reader that shares the same pair (YID, ID) with the tag.

To a reader without knowledge of the pair (YID, ID), a single output of the tag is indistinguishable from a random value and cannot be correlated with previous or future outputs. An eavesdropper on the communication between the tag and reader cannot acquire any further information about the tag.

The mutual authentication method described above may restrict the ability of malicious users to cycle the tag value along the hash chain, or for the tags or accompanying devices such as the device described in the applicants' co-pending patent application no. GB 0428543.3 to identify legitimate readers.

Known authentication methods that generate tag identifiers by a one way function as described above cannot be considered as an efficient solution. First they suffer of scalability issues, as upon obtaining a hashed value, the reader must check through all combinations of possible tags. Second, they do not support the secure transfer of ownership. A reader that has been previously granted access to a tag can continue to read the tag. The apparatus and the method of the present invention however addresses both problems.

Figure 5:
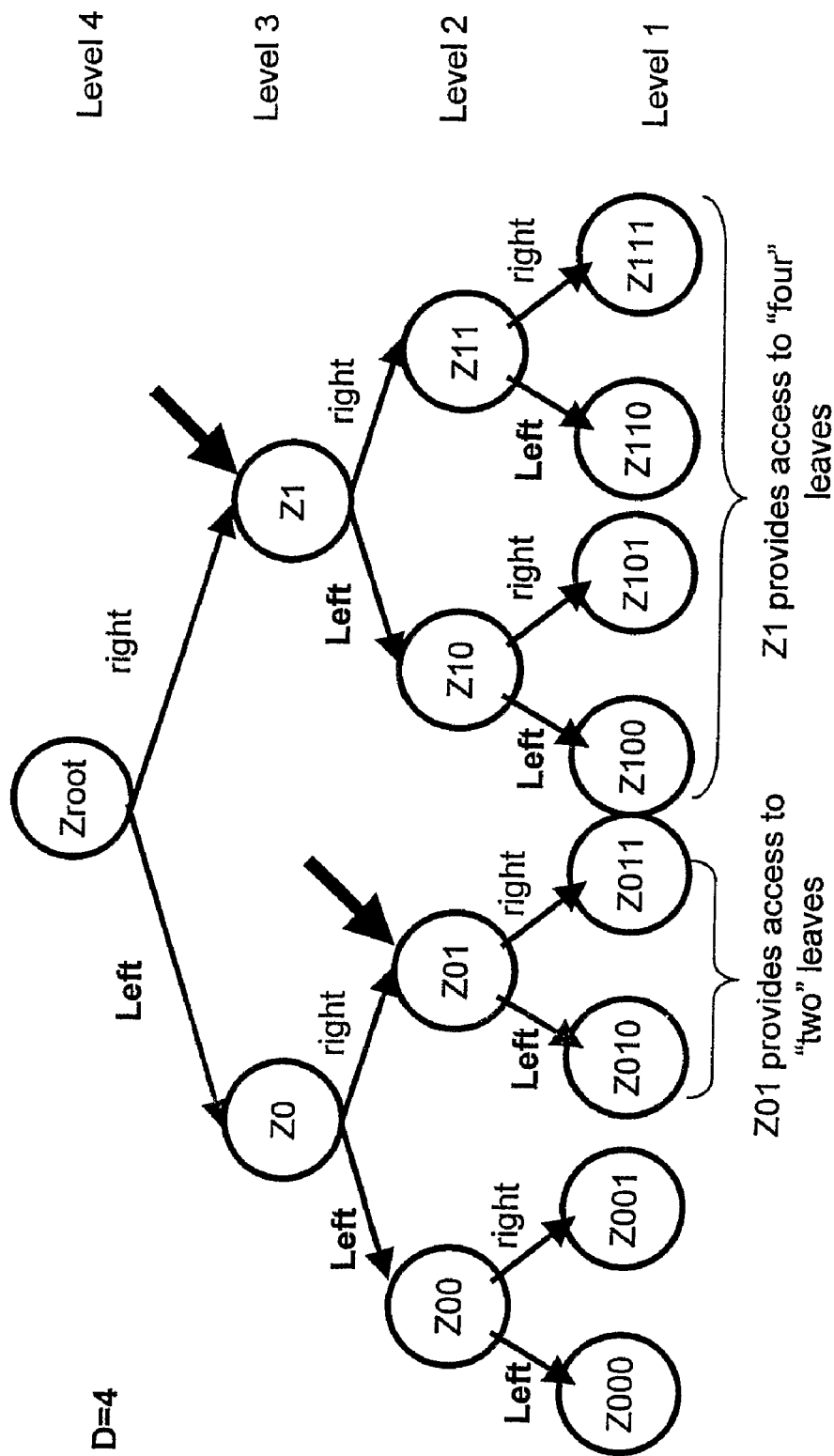
FIG. 5 depicts a binary one-way tree

FIG. 5 shows a binary one-way tree with two one-way functions. They are here termed respectively, the 'left' and the 'right' functions. Typically they could be constructed using a one-way hash function such as the SH1 or MD5 algorithms.

The sequence of keys in the tree can be constructed as follows. An initial root seed 'S(root)' is associated with the tree and a parameter of depth D expresses the number of leaves of the tree N=2d−1.

The intermediate values are generated as follows:
1. The D level key values are Z(0)=left {Z(root)}, Z(1)=right {Z(root)}.
2. The D−1 level of keys would be: Z(00)=left {Z(0)}, Z(01)=right {Z(0)}, Z(10)=left{Z(1)}, Z(11)= right {Z(1)}.
3. The D−2 level of the tree would be: Z(000)=left {Z(00)}, Z(001)=right {Z(00)}, Z(010)=left {Z(01)}, Z(011)=right {Z(01)}, Z(100)=left {Z(10)}, Z(101)=right {Z(10)}, Z(110)=left {Z(11)}, Z(111)=right {Z(11)} and so on, creating a binary tree of intermediate seed values to a depth of D levels.

In this example, it can be noted that:
A seed at a level 'i' generates a 2^(i−1) number of leaves.
The children of a seed bear no resemblance to each other, owing to the properties of the "left" and "right" one-way functions.
The children in the tree are half as valuable as the parent, in that a parent can generate twice as many leaves and consequently gives greater access to the tag identifiers. If access to a part of the tree is to be granted, access is given to the smaller set of seeds closest to the leaves that enable the calculation of all the keys in the tree to be disclosed. When the access to a seed is given, the receiver needs to know where the seed resides in the tree.

In a tree of e.g. D=8, if access is given to a seed at level 3 (e.g. S001), the receiver will be able to generate 4 leaf keys. All the other keys will remain hidden. The choice of the level limits the number of keys disclosed. If more keys need to be accessed by the reader a new key or keys can be disclosed to extend the reader access.

The above tool can be used to grant a reader temporary access by applying to the hash based authentication scheme discussed above with FIG. 4, but limiting the number of reading operations available to the reader. In addition to achieving the purpose of restricting tag access by readers that were once authorised but which no longer are, this helps reduce the computational complexity for the reader.

According to this aspect of the invention, the seed YID k used in the authentication protocol is a leaf of the binary one-way tree. As described above, YID k is changed for every reading operation. YID k progresses along the leaves of the tree.

The advantages of a scheme implemented according to the invention in this way are:

A well-defined sequence is presented to the reader so that the reader and tag sharing knowledge of this sequence can communicate.

Revealing intermediate values in the tree can reveal a sub-sequence to the reader. The reader will only be able to authenticate and access the tag for a limited number of reading operations (since it will run out of tree leaf values that it understands).

To gain access to a tag for 'n' operations the reader may be given as little as 1 seed at a level log(n)+1. For example, 8 read operations may be granted by knowing a single seed value at level 4. Alternatively 8 read operations may be granted by 2 seeds each at level 3. The number of keys that must be granted for 'n' operations varies depending upon the starting position in the tree.

A reader that knows a value of the tree is now loosely coupled to the tag, and only for the duration of the read operations for which sufficient seeds are known. All tags generate a new pseudonym per reading query. No tag re-coding operation is required when an item changes hands since a reader would only be able to track and access the tag for the number of reading operations granted to it. When the reader reaches the end of the number of granted operations granted to it, its access to the tag is automatically ends. In a case where a tag is transferred from one party to the next in the chain with read operations still unused by the previous party, it is possible to dispose of these operations. This can be achieved through multiple reads of the tag, or if the reading protocol is extended, it can be possible to skip directly to a value some distance along the tree leaves. This serves to revoke previous access rights to the tag without the requirement to write new secrets to the tag.

The coupling between a reader and a tag is left to the third party authority. In a possible scenario, the original manufacturer controls the pair (YID, ID) and acts as a third party authority for tags to store reader credentials and to grant or deny access. When a reader needs to access a specific tag, it requires a set of seeds (or elements of the tree). The set consists of intermediate nodes of the tree that give access to the required number of read operations. The number of permitted operations can be extended by a new authorisation request.

When requesting authorisation, a new reader must inform the third party authority of the current state of the tag. This is because the third party authority does not know the current state of the tag and which leaf value it is currently using. The third party authority could calculate both the tag ID and the current state of the tree sequence from the pseudonym value generated by the tag.

The third party authority needs to know which seed to distribute to a certain reader without the reader knowing the tag identity beforehand. If the tag cannot release information about the tag ID to the currently unauthorised reader, it is possible that information about the state of the tree sequence can be released instead, to help the singulation of the tag ID/current key value pair.

One approach is that a reader, upon requiring access, would provide to a third party authority the usual credentials, along with the current tag message and a hint message generated from an intermediate node in the pseudonym tree along the path from the root to the leaf value currently used.

With the scheme described above, if a third party authority receives only the pseudonym from a tag, the process to identify the correct identity of that specific tag would have an order of complexity $O((n)(N))$, where n represents the number of leaves generated by a tree and N the number of tags managed by the third party authority.

The use of hint messages can reduce the computational complexity involved to identify a tag to an order of complexity of $O(N)$. In the scheme of the present invention, a hint can be used to identity the tag more quickly than searching for all the possible pseudonym space. Two distinct hint mechanism solutions will be proposed: tree location hints and root-to-leaf hints.

FIG. 6 shows as an example: at set-up time, the tag is again provided with a unique pair (YID, ID), where YID is the root seed of the tree for that tag. There is assumed to be a tree for 'n' reading operations where the tree depth is log(n)+1.

A tag with n=4096 will require a tree of depth d=12+1. An average of 2 one-way hash functions (minimum 1, maximum log(n)) would need to be computed for each reading operation provided the tag maintains the intermediate node values. In order to maintain a tree a tag is required to store the current position in the tree, for example with a counter. When queried, the tag generates a new leaf 'Yleaf' (previously referred to as YID k) and generates a message Sk=G(r1, G(r1, (Yleaf)).

Assuming an authorised reader has been granted access to a sub-set of the tree. A tag is identified by a reader by a pair (Yi, ID), Yi being an element of the tree at level 'i'. A secret at level 'i' (where i=1 is the leaf of the tree) will give access to $2(i-1)$ reading operations. For efficiency, 'i' is chosen to be a small value, which will limit the amount of work (to $2(2(i-1))-2$ hash functions evaluations) which needs to be performed by the reader to access a specific tag. Upon receiving the tag message the reader will find the pair (Yi, ID) that verifies the tag message.

On average, the invocation of four one-way hash functions for the tag (i.e. twice for the binary tree and twice G) is required for each reading cycle. The tree information needs to be updated at every cycle. This example uses a binary one-way tree and the tag may store log(n)+1 secrets from the root secret to the current leaf of the tree.

Scalability issues arises with the question of how a tag identity can be identified, when the reader does not know the identity of the tag. For example, a reader receives a new tag and it does not know which secret should be used for decoding the pseudonym. A third party authority could grant the access but in order to do so it needs to have some information about the current tree leaf used by the tag.

FIG. 7 depicts a solution according to the invention.

The tag can generate tree location hints. Hint messages contain information that points to a seed in the binary one-way tree. The hint can therefore act as an indicator to what part of the tree is currently used. By exploiting hint messages a third party authority can identify the tag and disclose to an authorised reader a valid set of seeds to access the tag from that point in time. Hint messages can be released at different levels between the root seed used to produce the pseudonyms, and the current pseudonym itself.

The scheme described now uses an interleaving of pseudonym values as described earlier in FIG. 3, with hints produced from the intermediate nodes of the tree. In this example, only one level of intermediate nodes are used to produce hint messages, although in practice, many levels can be used so long as the level is clearly indicated by the output of the tag. One drawback of interleaving hints (of different levels) and pseudonyms is that some sequence information is clear to an unauthorised reader and may be used for limited tracking of the tag. Another is that the tag pseudonym must be deliberately advanced to obtain a hint value. These issues are addressed by the alternative method of providing hint messages described below in connection with FIG. 10.

In the following steps we show how hint messages can be used to identify the current tag:

Every 2i reading operations, the tag discloses a hint message. A hint could be $H(Y_i)$, where $Y_i$ is a seed at level i that gives access to 2(i-1) operations and H is a hash function. $H(Y_i)$ does not disclose any information about the tree to adversaries because of the one-way function. $H(Y_i)$ it is shared (known) by the third party authority.

This hint would be used by the reader to request access. When a reader receives a new tag, it needs to retrieve $H(Y_i)$. The reader according to the scheme shown in FIG. 3, will repeatedly read the tag until the hint value is disclosed. At this point the reader would be able to access the third party authority and request access by providing the authority with the hint message.

If the reader is authorised, the third party authority would then communicate the seed value $Y_i$ to the reader. The reader will be temporarily granted access.

The use of the hint message is beneficial because it reduces complexity enormously. Without the use of hint messages, problems occur when either:

A tag arrives unexpectedly at a new owner with no information transferred with the tag.

Other parties have performed an unknown number of reads on the tag since it was last scanned by the particular reader.

In these instances, a reader must give up after a limited check along the pseudonym chain for each possible tag, and conclude that the tag is unknown. The reader cannot distinguish between a response for an unknown tag, and a pseudonym from a known tag but which is beyond the point to which the reader has checked.

With the hint message the complexity is reduced to $O((k)(N))$, where k depends on the level of the seed disclosed. If the level is high (where the hint is close to the root), the third party authority would have to do a limited number of hash operations to find the correct tree and to identify the tag. For example: d=10(tree dimension) i=8 to identify a tag the key authority goes through 2(d-i)=4 secrets. The search complexity is $O(4*N)$.

In this first embodiment, the process works as follows:
1. The reader reads the current pseudonym from the tag and attempts to match the pseudonym against the space of expected pseudonym values.
2. If this match fails, the reader obtains a hint value from the tag. This can be obtained by repeated reads until the hint value is obtained, or by a special instruction that advances the tag automatically until the hint value is given.
3. If the hint value is at a level in the hash tree that may be covered by the keys known to the reader, the reader can attempt to match the hint value with a known tag. For example, attempting to match against a hint value 4 levels above the leaves of the tree is equivalent to searching a space of 32 pseudonyms along the leaves of the tree. Thus by searching along the higher-level hint values known, the reader can quickly identify if the tag is known. The tag must give the reader information about the level hint being used.
4. If the hint value obtained is higher in the tree than the reader knows about, or if the hint value cannot be matched since it falls beyond the sequence known to the reader, then the reader must ask a third party authority. This authority may know the root seed, and thus all of the tree, or merely part of the tree but a part with more seeds than the reader itself knows.
5. If the above authority is unable to decode the hint message, the request may be referred to another authority, such as the root authority with knowledge of the whole tree, to decode the hint value.

The root authority can always decode the tag since it knows the root secret of the tree. For the root authority the cost of decoding the hint value depends upon the level of the hint in the tree. If the hint were the root value itself, then the authority can immediately look up the value in the list of root seeds. For some levels below the root, it is feasible to have pre-computed all of the possible values for each tag, and to perform an immediate look-up. If this match fails, then the tag is unknown to the authority. For hint values lower in the tree, the authority will store the last known position in the tree, and check along a limited space of values. If this search fails, then the tag may be unknown, or sufficiently advanced along the pseudonym tree so as to fail the identification. It should be noted again that searching a limited set of hint messages is equivalent to searching a much larger pseudonym space along the leaves of the tree.

It should be noted that multiple levels in the tree can be used as hint values in a system according to the invention. Indeed, one solution is to use all levels in the tree, by providing "root-to-leaf hints". One implementation of releasing hints at all levels is described as follows.

Interleaved pseudonym values and hint messages can be produced in response to the reader request. The tag can respond in the same manner in both cases, but using the hash value of an intermediate nodes in the tree instead of the hash value at the leaf, that is of a node which is nearer to the root than is the leaf. The release of hint messages may thus be integral to the pseudonym sequence. For example, the hash values may be the values in the tree depicted in FIG. 5, revealed left-to-right.

In this figure, the hash value used to produce the tag response may progress: Z000, Z00, Z001, Z0, Z010, Z01, Z011 and so on. Each release must be identified with the level used so that a reader can ascertain which hash values to attempt to match with.

The cost-benefits of including hint messages in a system of the invention will now be discussed. As noted above, a reader in receipt of a pseudonym may find it difficult to identify a tag without a hint message. The pseudonym will be checked against a set of expected pseudonyms and tags. The set of tags can be restricted by knowledge (such as process/inventory knowledge about what products might arrive in front of a particular reader on that day, etc). By starting the search from the last known pseudonym value however, pseudonym search can be limited. The use of hint messages allows the search to be performed across a far smaller set of values at an intermediate level in the tree. Moreover, hints obtained from multiple levels of the tree simultaneously can enable both the quick identification of the tag (from a high level hint), and the ease of navigation down to the current leaf pseudonym (but matching intermediate level hints).

We now present a second embodiment that improves the efficiency of the tag reading operation by combining the pseudonym along with hints in a combined tag message.

This approach (shown in FIGS. 8, 9 and 10) releases hint information along with the pseudonym as an integral part of the tag response. While the tag response is larger, the advantages are considerable since the pseudonym does not need to be advanced by the reader to obtain a hint value, as would be necessary for the embodiment discussed in connection with FIG. 3 above. Also the hint values released at the same time as the pseudonym allow the reader (or authority) to navigate directly to the pseudonym instead of searching a space for the match.

This alternative approach decreases the complexity in the back-end system but increases the communication complexity in terms of messages exchanged between the reader and the tag.

Here, H is defined as a one-way hash function and R is defined as a pseudo-random number. A tag is identified by a pair of identifiers (YID, ID), where YID is a secret and ID is the tag identifier. During a reading operation, the reader sends a random number R1, the tag sends in response a message R1, R2, H(R1, R2, YID). Only readers that have access to the pair (YID, ID) can identify the tag.

The generation of the random number can be obtained in two ways: (i) through a random number generator, or (ii) through a one-way hash function. In the use of a one-way hash function, we generate R being a random number, R=H(CNT, S), CNT is a counter incremented at every reading operation, S is a 128 bit secret (not shared), H is a one-way hash function or pseudo-random-function.

This scheme implements some of the suggestions proposed in the publication David Molnar, David Wagner: "Privacy and security in library RFID Issues, Practices and Architectures" (2004 ACM Computer and Communications Security conference). However, Molnar and Wagner's scheme does not allow for control or ownership of a tagged item to change hands, whereas our approach of applying the binary one-way hash tree allows for the provision of limited access to the tag identity.

In applying the one-way binary tree tool presented above the computational complexity of the back-end system is reduced. The secret YID is associated with the seed in the binary one-way tree. Unlike the first scheme described above, the tag does not generate a single output associated with the leaf of the tree, but multiple outputs associated with the different secrets from the root to the leaf of the tree.

As shown in FIG. 8, the tag is provided at set-up time with a unique pair of identifiers (ZRoot, ID), where YID=ZRoot is the root seed of the tree. As a result, there is a tree for 'n' reading operations, where the tree depth D=log(n). An average of 2 one-way hash functions would need to be computed for each reading operation.

When interrogated by the reader, the tag generates a new leaf of the tree that includes a new branch. The reader sends a random number R1, and the tag sends a sequence of messages R1, R2, H(R1, R2, Z-root), H(R1, R2, Zi), H(R1, R2, Zi+1), H(R1, R2, Zlog,(n)). The messages of the sequence are associated with the different seeds from the root to the leaf of the tree.

In this case a tag is not identified with a single pseudonym produced from a leaf, but with a sequence of messages. The reader or third party authority will not have to progress the authentication of the tag from a shared seed to the leaf with a complexity O(N.log(n)), but will access directly the seed with a O(N) complexity.

As in the previous case an authorised reader can be assumed to have been granted access to a sub-set of the tree. In FIG. 9, a tag is identified by a reader through a pair (Yi, ID), where Yi is an element of the tree at level 'i'. A secret at level 'i' will give access to 2(i−1) reading operations. Upon receiving the tag message, the back-end system will find the pair (Yi, ID) that verifies the tag message.

This scheme is as private as before but it allows the authentication of a tag with a limited cost. The cost that is linear with the number of tag O(N) and the communication cost has a complexity of O(log(n)). It is important to notice that the output of the different messages can be truncated to fewer bits in this manner the communication cost can be improved.

FIG. 10 depicts the role of the hint message in the present embodiment.

In the first scheme above discussed in connection with FIG. 1 for example, a tag generates some explicit hints. By exploiting hint messages a third party authority can identify the tag and disclose to an authorised reader a valid seed to access the tag.

In this case however, explicit hint messages need not be generated. When a reader receives a message that cannot be authenticated, it passes the message to a third party authority that can verify the root seed and identify the tag. In this case the output of the tag implicitly contains index information. After identifying a tag the third party authority will grant access to that specific tag for a certain number of reading operations.

Further improvement in terms of scalability can be achieved by implementing this scheme with the pseudonym tree proposed by Molnar and Wagner in the paper cited above. The cost of search for a third party for the combined scheme would be of O(log(N)) and it would allow for control of ownership and limited access to the tag identity. We have described a scheme with branching factor of two but in practice we could use much larger factors (e.g. 10). A larger branching factor would reduce the tag storage and the computation cost for the tag.

The present invention describes a secure, efficient way of allowing only authorised readers to have access to information relevant to it for a limited period of time. This is achieved through constantly changing the tag identifier, allowing more flexibility to control tag access.

The skilled person would also appreciate that there may be other ways to implement the invention so it is not limited to the particular implementation described herein; nor is it limited to use in the particular contexts described. For example, the use of the tree structure described above is not limited to two-branch trees—trees with more branches could also be used.

The invention claimed is:

1. A radio frequency identification transponder configured to respond, on detecting an interrogation attempt, by providing an output which is an identifier, the identifier being, or being based upon, a leaf or a node of a hash tree of at least binary order, wherein the identifier which is provided is different for every detected interrogation attempt, and which provides, in response to each of a sequence of detected interrogation attempts, one identifier of a predetermined sequence of identifiers which sequence is or is based on a predetermined sequence of leaves of the hash tree.

2. A radio frequency identification transponder as claimed in claim 1, wherein each identifier output by the transponder in response to detection of an interrogation attempt is a combination of: (i) a leaf of the hash tree or based on a leaf of the hash tree; or (ii) a node of the hash tree or based on a node of the hash tree; or is based on such a combination.

3. A radio frequency identification transponder as claimed in claim 1, wherein each identifier output by the transponder in response to detection of an interrogation attempt is either: (i) a leaf of the hash tree or based on a leaf of the hash tree; or (ii) a node of the hash tree or based on a node of the hash tree.

4. A radio frequency identification transponder as claimed in claim 3, wherein each identifier output by the transponder in response to detection of an interrogation attempt is a leaf of the hash tree or based on a leaf of the hash tree.

5. A radio frequency identification transponder as claimed in claim 1, wherein the hash tree is a one-way binary hash tree.

6. A system for providing a reader of RFID transponders with the right to read a particular transponder for only a predetermined multiplicity of read attempts, the system comprising: the reader; an authorization device; and a radio frequency identification transponder configured to respond, on detecting an interrogation attempt, by providing an output which is an identifier, the identifier being, or being based upon, a leaf or a node of a hash tree of at least binary order, wherein the identifier which is provided is different for every detected interrogation attempt; the authorization device and the transponder sharing knowledge of the hash tree of the tag which knowledge is not known to the reader;
   wherein the reader is:
   (i) configured to interrogate the transponder, to obtain an identifier output by the transponder;
   (ii) arranged to contact the authorization device and to reveal its own identity and the obtained identifier; the authorization device being arranged to check the entitlement of the reader to read the transponder and, if the reader is entitled to read the transponder, to provide to the reader information about the hash tree to permit the reader to read the transponder over/for the predetermined multiplicity of a interrogation attempts.

7. A method for providing a reader of radio frequency identification transponders with the right to read a particular transponder for only a predetermined multiplicity of read attempts, the transponder being configured to respond, on detecting an interrogation attempt, by providing an output which is an identifier, the identifier being, or being based upon, a leaf or a node of a hash tree of at least binary order, wherein the identifier which is provided is different for every detected interrogation attempt, the method comprising:
(i) interrogating the transponder with the reader to obtain an identifier output by the transponder;
(ii) providing, from the reader, an authorization authority with the identity of the reader and the obtained transponder identifier; and
(iii) the authorization authority checking the entitlement of the reader to read the transponder and, if the reader is entitled to read the transponder, providing to the reader information about the hash tree to permit the reader to read the transponder over/for the predetermined multiplicity of a interrogation attempts.

* * * * *